United States Patent
Fujita et al.

(10) Patent No.: US 10,800,933 B2
(45) Date of Patent: Oct. 13, 2020

(54) SURFACE TREATMENT SOLUTION FOR PLATED STEEL SHEET TO BE HOT-PRESSED

(71) Applicants: NIPPON STEEL & SUMITOMO METAL CORPORATION, Tokyo (JP); NIHON PARKERIZING CO., LTD., Tokyo (JP)

(72) Inventors: Soshi Fujita, Tokyo (JP); Jun Maki, Tokyo (JP); Shintaro Yamanaka, Tokyo (JP); Masao Kurosaki, Tokyo (JP); Tatsuya Suzuki, Tokyo (JP); Kensuke Mizuno, Tokyo (JP); Takumi Kozaki, Tokyo (JP); Takahiro Kodama, Tokyo (JP)

(73) Assignee: NIHON PARKERIZING CO., LTD., Tokyo (JP)

( * ) Notice: Subject to any disclaimer, the term of this patent is extended or adjusted under 35 U.S.C. 154(b) by 0 days.

(21) Appl. No.: 15/578,845

(22) PCT Filed: Jun. 3, 2016

(86) PCT No.: PCT/JP2016/066686
§ 371 (c)(1),
(2) Date: Dec. 1, 2017

(87) PCT Pub. No.: WO2016/195101
PCT Pub. Date: Dec. 8, 2016

(65) Prior Publication Data
US 2018/0171164 A1    Jun. 21, 2018

(30) Foreign Application Priority Data
Jun. 4, 2015 (JP) ................... 2015-114043

(51) Int. Cl.
  *C09D 7/61* (2018.01)
  *B21D 22/02* (2006.01)
  (Continued)

(52) U.S. Cl.
  CPC ............. *C09D 7/61* (2018.01); *B21D 22/022* (2013.01); *B21D 22/20* (2013.01); *C09D 5/024* (2013.01);
  (Continued)

(58) Field of Classification Search
  CPC ... C09D 7/61; C09D 7/67; C09D 7/68; C09D 5/024; B21D 22/022; B21D 22/20;
  (Continued)

(56) References Cited

U.S. PATENT DOCUMENTS 7,959,982 B2    6/2011 Le Craz
2007/0170067 A1*  7/2007 Kubota ................... C25D 3/56
                                              205/244

(Continued)

FOREIGN PATENT DOCUMENTS

JP    2009-120721 A    6/2009
JP    2011-102359 A    5/2011
(Continued)

OTHER PUBLICATIONS

Extended European Search Report, dated Jan. 7, 2019, for corresponding European Application No. 16803532.7.
(Continued)

*Primary Examiner* — Josephine L Chang
(74) *Attorney, Agent, or Firm* — Birch, Stewart, Kolasch & Birch, LLP

(57) ABSTRACT

A surface treatment solution for a plated steel sheet to be hot-pressed comprising a ZnO aqueous dispersion (A) and a water dispersible organic resin (B), wherein the ZnO aqueous dispersion (A) comprises water and ZnO particle size
(Continued)

having 50 to 300 nm particles, the water dispersible organic resin (B) has a 5 to 45 mgKOH/g acid value and 5 to 300 nm emulsion particle size, and a mass ratio ($W_A/W_B$) of a mass of ZnO particles in the ZnO aqueous dispersion ($W_A$) to a mass of solid content of the water dispersible organic resin ($W_B$) is 30/70 to 95/5.

12 Claims, 1 Drawing Sheet

(51) Int. Cl.
C09D 5/02 (2006.01)
C09D 7/40 (2018.01)
B21D 22/20 (2006.01)
C23C 28/00 (2006.01)
C23C 2/12 (2006.01)
C08K 3/22 (2006.01)
C08K 7/18 (2006.01)

(52) U.S. Cl.
CPC ................. *C09D 7/67* (2018.01); *C09D 7/68* (2018.01); *C23C 2/12* (2013.01); *C23C 28/00* (2013.01); *C08K 3/22* (2013.01); *C08K 7/18* (2013.01); *C08K 2003/2296* (2013.01); *C08K 2201/005* (2013.01)

(58) Field of Classification Search
CPC .... C08K 3/22; C08K 7/18; C08K 2003/2296; C08K 2001/005; C08K 2201/005; C23C 2/12; C23C 28/00
USPC .......................................................... 524/404
See application file for complete search history.

(56) References Cited

U.S. PATENT DOCUMENTS

| | | |
|---|---|---|
| 2010/0233490 A1 | 9/2010 | Morishita et al. |
| 2010/0286322 A1 | 11/2010 | Yabuki et al. |
| 2011/0030441 A1 | 2/2011 | Maki et al. |
| 2014/0050925 A1 | 2/2014 | Sueda et al. |
| 2015/0044499 A1 | 2/2015 | Maki et al. |

FOREIGN PATENT DOCUMENTS

| | | | |
|---|---|---|---|
| JP | 2013-194258 A | | 9/2013 |
| JP | 2013-221202 A | | 10/2013 |
| JP | 2013-244696 A | | 12/2013 |
| KR | 10-2009-0025263 A | | 3/2009 |
| RU | 2353702 C2 | | 4/2009 |
| WO | WO 2009/131233 A1 | | 10/2009 |
| WO | WO 2012/147886 A1 | | 11/2012 |
| WO | WO 2013/116103 A1 | | 8/2013 |
| WO | WO 2013/157522 A1 | | 10/2013 |

OTHER PUBLICATIONS

International Search Report (Form PCT/ISA/210) issued in International Application No. PCT/JP2016/066686 dated Jul. 12, 2016.
Written Opinion of the International Searching Authority (Form PCT/ISA/237) issued in International Application No. PCT/JP2016/066686 dated Jul. 12, 2016.
Russian Office Action and Search Report for corresponding Russian Application No. 2017146830, dated Nov. 2, 2018, with English translation.
Indian Office Action for corresponding Indian Application No. 201717042803, dated May 29, 2019, with English translation.
Korean Office Action dated Apr. 19, 2019, issued in Korean Patent Application No. 10-2017-7034057.

\* cited by examiner

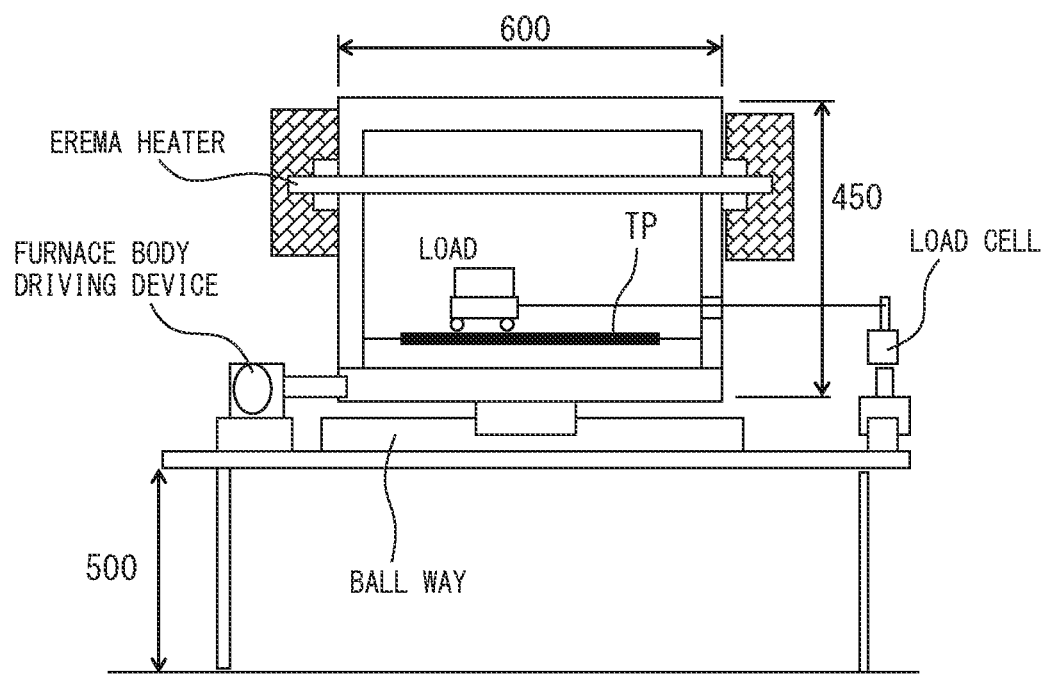

SURFACE TREATMENT SOLUTION FOR PLATED STEEL SHEET TO BE HOT-PRESSED

TECHNICAL FIELD

The present invention relates to a surface treatment solution giving a surface treatment coating excellent in waterproofness, solvent resistance, and adhesion with a plated steel sheet.

BACKGROUND ART

In recent years, to protect the environment and prevent global warming, there has been rising demand for keeping down the consumption of chemical fuels. This demand has influenced various manufacturing industries. For example, automobiles, essential as transportation for daily life and activities, are no exceptions. Improvement of fuel efficiency and the like through weight reduction of car bodies and the like is being sought. However, with automobiles, simple weight reduction of car bodies is not allowed in terms of product quality. Suitable safety has to be secured.

Most of the structure of a car body is formed by iron, in particular steel sheet. Reducing the mass of the steel sheet is important in the weight reduction of car body. However, as explained above, it is not allowed to just reduce the mass of the steel sheet. It is demanded that the mechanical strength of the steel sheet be secured. Similar demands on steel sheet are being made in various manufacturing industries besides the automobile manufacturing industry.

For this reason, R&D is underway on raising the mechanical strength of steel sheet so as to obtain steel sheet enabling the mechanical strength to be maintained or further raised even if making the sheet thinner than steel sheet used up to now.

In general, material having a high mechanical strength often has a low shape freezability in bending or other forming processes, so when working it into complicated shapes, the working process itself becomes difficult. As one of the means for solving this problem relating to formability, there is the so-called "hot-pressing" (also called the "hot-stamping", "hot-press", or "die quenching").

In the hot-pressing, the material to be shaped is heated once to a high temperature to make it soften, is press-formed, and then is cooled. According to this hot-pressing, since the material is heated once to a high temperature to make it soften, it can be easily pressed by a die. Furthermore, due to the hardening by the contact cooling with the die after shaping, the mechanical strength of the material rises. Therefore, hot-pressing enables products with both good shape freezability and high mechanical strength to be obtained.

However, when applying the hot-pressing to steel sheet, the steel sheet is heated to, for example, a 800° C. or more high temperature, so the iron at the steel sheet surface oxidizes to form scale (oxides). Therefore, after hot-pressing, a process to remove the scale (descaling process) is necessary, so the productivity falls. Further, in the case of a member requiring corrosion resistance, it is necessary to treat the surface of the member after being shaped so as to prevent rust or to cover the metal. For this reason, a surface cleaning process and a surface treatment process is further necessary and the productivity falls.

As such a method of suppressing the fall in productivity, there is the method of covering the steel sheet in advance. In general, as normal materials for covering steel sheet, organic materials, inorganic materials, and various other materials are being used. Among these, steel sheet covered by zinc plating, which has a sacrificial corrosion action against steel sheet, is being widely used for steel sheet for automobiles and the like from the viewpoint of corrosion prevention performance and production technology.

However, the heating temperature in hot-pressing (700 to 1000° C.) is higher than the decomposition temperature of organic materials and the melting point and boiling point of the metal materials such as Zn-based, so when heated at the time of hot-pressing, sometimes the plating layer of the steel sheet surface melts and evaporates and the surface properties remarkably deteriorate.

Accordingly, as steel sheet for hot-pressing, for example, steel sheet covered by metal containing Al having a higher melting point and boiling point compared with a covering of an organic material or a covering of a Zn-based metal, so-called Al plated steel sheet, is often used.

If covering a steel sheet with a metal containing Al, it is possible to prevent the formation of scale at the steel sheet surface and a descaling process and other processes become unnecessary, so the productivity is improved. Further, a covering of metal containing Al also has a rustproofing effect, so the corrosion resistance after painting is also improved.

Patent Literature 1 discloses the technique of using a wurtzite type compound (ZnO) to cover the surface of an Al plated steel sheet and improve the hot-pressing lubricity and chemical convertability (chemical coating formability) after hot-pressing. This technique is effective for improvement of the hot-pressing lubricity, gives excellent chemical convertability after hot-pressing, and improves the corrosion resistance after painting as well.

However, in Patent Literature 1, a water-soluble resin, silane coupling agent, and the like is used as a binder for the wurtzite type compound of the ZnO particles, so the coating is inferior in waterproofness and solvent resistance. Further, the adhesion between the coating and Al plated steel sheet is not sufficient. Therefore, at locations where the ZnO coating drops off, hot-pressing lubricity, chemical convertability after hot-pressing, and corrosion resistance after painting are also not stably expressed. Further, the ZnO particles in the treatment solution are not sufficiently stable, so the ZnO particles easily aggregate and precipitate and the productivity falls.

CITATION LIST

Patent Literature

Patent Literature 1: WO2009/131233A

SUMMARY OF INVENTION

Technical Problem

As explained above, Al plated steel sheet having high melting point Al (Al plated steel sheet) is considered promising as steel sheet for automobile where corrosion resistance is demanded. Technique is proposed for using the wurtzite type compound of ZnO particles and water-soluble resin to cover the surface of Al plated steel sheet to thereby improve the hot-pressing lubricity and chemical convertability after hot-pressing. However, if using a water-soluble resin, since a sufficient performance cannot be obtained as a binder, the coating becomes inferior in waterproofness and solvent resistance. Further, adhesion of the ZnO coating with respect to the plated steel sheet cannot be obtained. As a result, in actuality, the hot-pressing lubricity, the chemical convertability after hot-pressing, and the corrosion resistance after painting cannot be stably obtained. Further, if using a silane coupling agent as a binder, silica remains after heating and the chemical convertability at the time of painting is obstructed, so the corrosion resistance after painting cannot be obtained.

Therefore, the present invention, in consideration of the above problem, has as its problem the improvement of the waterproofness, solvent resistance, and adhesion with the plated steel sheet of surface treatment coating in a plated steel sheet so as to stably secure formability at the time of hot-pressing, the chemical convertability after hot-pressing, the corrosion resistance after painting, and the spot weldability and has as its object the provision of a surface treatment solution of plated steel sheet for hot-pressing solving this problem.

Solution to Problem

The inventors engaged in intensive studies to solve the above problem and as a result found that by using a surface treatment solution containing a specific ZnO aqueous dispersion and water dispersible organic resin to form a surface treatment coating containing ZnO particles and a water dispersible organic resin in a specific mass ratio on the surface of a plated steel sheet, the waterproofness, solvent resistance, and adhesion with the plated steel sheet of the coating are improved and further a hot-pressing lubricity, chemical convertability after hot-pressing, corrosion resistance after painting, and spot weldability are stably secured. That is, the gist of the present invention is as follows:

(1) A surface treatment solution for a plated steel sheet to be hot-pressed comprising a ZnO aqueous dispersion (A) and a water dispersible organic resin (B), wherein
the ZnO aqueous dispersion (A) comprises water and ZnO particles having an average particle size of 10 to 300 nm,
the water dispersible organic resin (B) has a 5 to 300 nm emulsion average particle size, and
a mass ratio ($W_A/W_B$) of a mass ($W_A$) of ZnO particles in the ZnO aqueous dispersion to a mass ($W_B$) of solid content in the water dispersible organic resin is 30/70 to 95/5.

(2) The surface treatment solution for a plated steel sheet to be hot-pressed according to (1), wherein the water dispersible organic resin (B) is one or more types of resin selected from a group consisting of a water dispersible polyurethane resin, a water dispersible epoxy resin, a water dispersible acryl resin, and a water dispersible polyester resin.

(3) The surface treatment solution for a plated steel sheet to be hot-pressed according to (1) or (2), wherein the water dispersible organic resin (B) has a number average molecular weight of 10000 or more.

(4) The surface treatment solution for a plated steel sheet to be hot-pressed according to any one of (1) to (3), wherein the water dispersible organic resin (B) is one or more types of resin having a 5 to 45 mgKOH/g acid value and selected from a group consisting of a water dispersible polyurethane resin, a water dispersible acryl resin, and a water dispersible polyester resin.

(5) The surface treatment solution for a plated steel sheet to be hot-pressed according to any one of (1) to (4), comprising at least one type of additive (C) selected from compounds comprising elements selected from the group consisting of B, Mg, Si, Ca, Ti, V, Zr, W, and Ce.

(6) The surface treatment solution for a plated steel sheet to be hot-pressed according to (5), wherein a mass ratio ($W_C/W_A$) of a mass ($W_A$) of the ZnO particles in the ZnO aqueous dispersion to a mass ($W_C$) of the additive (C) is 0.05 to 0.6.

(7) The surface treatment solution for a plated steel sheet to be hot-pressed according to any one of (1) to (6), wherein the ZnO particles have an aspect ratio (long axis/short axis) of 1 to 2.8.

(8) The surface treatment solution for a plated steel sheet to be hot-pressed according to any one of (1) to (7), wherein the ZnO aqueous dispersion (A) comprises one or both of an anionic dispersant and nonionic dispersant.

Advantageous Effects of Invention

According to the present invention, it is possible to provide a specific surface treatment solution, excellent in stability at the time of storage, containing a ZnO aqueous dispersion and water dispersible organic resin. Further, it is possible to use this surface treatment coating to secure waterproofness, solvent resistance, and adhesion with a plated steel sheet of the coating and to stably obtain a plated steel sheet excellent in hot-pressing lubricity, chemical convertability after hot-pressing, corrosion resistance after painting, and spot weldability.

BRIEF DESCRIPTION OF DRAWINGS

FIG. 1 is a schematic view of a hot Bowden tester used in the examples. In FIG. 1, numeral "600" denotes the width (mm) of a furnace body of the Bowden tester; numeral "450" denotes the height (of a furnace body of the Bowden tester; numeral "500" denote the height (mm) of a table of the Bowden tester; and symbol "TP" denotes a test piece.

DESCRIPTION OF EMBODIMENTS

<Plated Steel Sheet>
The steel sheet which is able to use the surface treatment solution of the present invention is a plated steel sheet, for example, steel sheet on one side or both sides of which a plating layer containing at least Al is formed.

(Steel Sheet)
The steel sheet is preferably steel sheet having the required mechanical characteristics after hot-pressing (meaning various characteristics including tensile strength, yield point, elongation, drawing ability, hardness, impact value, fatigue strength, creep strength, and the like relating to mechanical deformation and fracture). The above steel sheet, for example, contains, by mass %, at least one or more of C: 0.1 to 0.4%, Si: 0.01 to 0.6%, Mn: 0.5 to 3%, Ti: 0.01 to 0.1%, and B: 0.0001 to 0.1% and has a balance of Fe and unavoidable impurities. "Hot pressing" means, for example, making the steel sheet 900° C. by raising the temperature in the atmosphere to 900° C., then holding the sheet there for 1 minute and rapidly cooling it through the die.

(Plating Layer)
The plating layer of the plated steel sheet, as explained above, is formed on one side or both sides of the steel sheet. The plating layer is, for example, formed by the hot dip coating method, but the method of forming the plating layer is not limited to the hot dip coating method. The object of forming the plating layer includes the prevention of formation of scale (iron oxides) at the steel sheet surface at the time of the heating in the hot-pressing, so the plating layer is preferably formed at both sides of the steel sheet.

The plating layer should contain at least Al. The content of Al in the plating layer is at least 10 mass %, typically is 80 mass % or more. The components other than Al are not particularly limited, but Si may be added for the following reasons.

Si is an element suppressing the formation of a Fe—Al alloy layer at the time of hot dip coating. If the amount of addition of Si in the plating layer containing Al is less than 3 mass %, at the time of hot dip coating, the Fe—Al alloy layer thickly grows. Further, at the time of working, there is a possibility of fracture of the plating layer being aggravated and the corrosion resistance being impaired. Further, if the amount of addition of Si in the plating layer containing Al is over 15 mass %, the plating layer containing Al will fall in workability and corrosion resistance. For this reason, the amount of addition of Si in the plating layer containing Al is preferably 3 to 15 mass %.

The plating layer containing Al of the above chemical composition prevents the corrosion of steel sheet during transport before hot-pressing and during transport after hot-pressing and when plated steel sheet is used as an auto-part. Further, at the time of heating during hot-pressing, it prevents the formation of scale (iron oxides) at the steel sheet surface. These effects are obtained when the content of Al in the plating layer is 10 mass % or more, more preferably are obtained at 80 mass % or more.

By the presence of a plating layer containing Al at one side or both sides of steel sheet, the descaling process after hot-pressing, the surface cleaning process, the surface treatment process, and the like may be omitted or simplified, so the productivity is improved. Further, the plating layer containing Al has a higher melting point and boiling point than covering by an organic material or covering by another metal material (for example, a Zn-based material), so at the time of hot-pressing, high temperature working becomes possible.

Part of the Al contained in the plating layer containing Al becomes alloyed with the Fe in the steel sheet at the time of hot dip coating and the time of hot-pressing. Accordingly, the plating layer containing Al is not necessarily formed by a single layer with a constant chemical composition, but is a plating layer including partially alloyed layers (alloy layers).

<Surface Treatment Solution>

The surface treatment solution for the plated steel sheet to be hot-pressed of the present invention is a surface treatment solution for a plated steel sheet to be hot-pressed containing a ZnO aqueous dispersion (A) comprised of average particle size 10 to 300 nm ZnO particles dispersed in water and a water dispersible organic resin (B) having an emulsion average particle size of 5 to 300 nm and having a mass ratio ($W_A/W_B$) of the mass of the ZnO particles in the ZnO aqueous dispersion ($W_A$) to the mass of the solid content in the water dispersible organic resin ($W_B$) of 30/70 to 95/5.

The "mass ratio ($W_A/W_B$)" referred to here, for example, may be obtained by taking a predetermined amount of the surface treatment solution (mass W) and heating it in the atmosphere at 900° C. to cause the water content to evaporate, burning off the water dispersible organic resin, designating the remaining ZnO amount as $W_A$, and calculating $W_B$ from $W-W_A$ to find ($W_A/W_B$).

(ZnO Aqueous Dispersion (A))

The ZnO particles contained in the ZnO aqueous dispersion (A) used in the present invention has an average particle size of 10 to 300 nm. In the ZnO aqueous dispersion (A), it is considered that the ZnO particles may be partially aggregated. Therefore, the "average particle size" referred to here is the average particle size including also aggregated particles. If the ZnO particles exceed 300 nm in average particle size, they precipitate and caking easily occurs, so the storage stability of the surface treatment solution cannot be secured. Further, if the ZnO particles are less than 10 nm in average particle size, the particles easily aggregate and precipitate along with the elapse of time making it impossible to secure the storage stability of the surface treatment solution. In this case, it sometimes becomes necessary to blend in a large amount of dispersant to stabilize the dispersion of the surface treatment solution, so this is not preferable.

The average particle size of the ZnO particles in the ZnO aqueous dispersion can, for example, be measured by a dynamic light scattering type particle size distribution measuring apparatus (Microtrac UPA-EX150, manufactured by Nikkiso Co., Ltd.). Alternatively, it may be similarly found by the method of coating the surface treatment solution on the surface of the plated steel sheet, drying it to obtain a coating, examining the surface by a field emission type scan electron microscope (FE-SEM), measuring 100 or more ZnO particles for the long axis and short axis, and finding the average value or the method of coating the surface treatment solution on the surface of the plated steel sheet, drying it to obtain a coating, and examining a cross-section of the surface by a transmission type electron microscope (TEM).

The aspect ratio (long axis/short axis) of the ZnO particles contained in the ZnO aqueous dispersion (A) used in the present invention is preferably 1 to 2.8. If the aspect ratio is over 2.8, a good hot-pressing lubricity cannot be obtained. If the aspect ratio is 1 to 2.8, the shape of the ZnO particles is sufficiently close to a spherical shape and the particle surface is low in flatness, so the contact area at the time of hot-pressing becomes small, the coefficient of friction becomes small, and the hot-pressing lubricity becomes excellent.

The aspect ratio of ZnO particles can be obtained by coating the surface treatment solution on the surface of the plated steel sheet, drying it to obtain a coating, examining the surface by a field emission type scan electron microscope (FE-SEM), measuring 100 or more ZnO particles for the long axis and short axis, and finding the average value. Alternatively, it can be similarly obtained by coating the surface treatment solution on the surface of the plated steel sheet, drying it to obtain a coating, and examining a cross-section of the surface by a transmission type electron microscope (TEM).

To secure the storage stability of the surface treatment solution, as a dispersant of a ZnO aqueous dispersion, one or both of an anionic dispersant and nonionic dispersant is preferably added. If using a cationic dispersant, the stability as a treatment solution when blended with a water dispersible organic resin cannot be secured. As examples of the anionic dispersant able to be used, ammonium naphthalenesulfonate, sodium naphthalenesulfonate, ammonium polyacrylate, sodium polyacrylate, and the like may be mentioned. As examples of the nonionic dispersant able to be used, polyoxyethylenenaphthyl ether, polyoxyethylenealkyl ether, and the like may be mentioned.

(Water Dispersible Organic Resin (B))

The coating obtained from the water dispersible organic resin (B) used in the present invention is excellent in waterproofness and solvent resistance and furthermore improves the adhesion with the plated steel sheet as the binder component of ZnO particles. Here, the "water dispersible organic resin" is an aqueous dispersion of an organic resin having an emulsion average particle size of 5 nm or more. The average particle size (median size) can be measured, for example, by a dynamic light scattering type particle size distribution measuring apparatus (Microtrac UPA-EX150, manufactured by Nikkiso Co., Ltd.). Note that, for example, a water soluble resin such as polyacrylic acid or polyvinyl alcohol or a water soluble polymer precursor such as a hydrolyzed product of a silane coupling agent does not form an emulsion, so is not a "water dispersible organic resin".

The number average molecular weight of the water dispersible organic resin (B) is preferably 10000 or more. If the number average molecular weight of the water dispersible resin (B) is 10000 or more, the barrier property when made into a coating rises, so the oxygen barrier property and water vapor barrier property rise and, further, resistance to water and solvents can be easily obtained. The number average molecular weight can be measured using gel permeation chromatography (GPC) and the like.

The acid value of the water dispersible organic resin (B) is preferably 5 to 45 mgKOH/g, more preferably 10 to 25 mgKOH/g in range. If the acid value of the water dispersible organic resin (B) is less than 5 mg KOH/g, the affinity with respect to water becomes lower and dispersion of the resin in a liquid as an emulsion becomes difficult, so a sufficient storage stability cannot be secured and further adhesion with a plated steel sheet sometimes cannot be obtained. If the acid value is over 45 mg KOH/g, the hydrophilic groups of the anion groups become excessive and water is easily taken in when forming the coating, the waterproofness becomes insufficient, and adhesion between the ZnO particles and plated steel sheet sometimes cannot be obtained. If the acid value is 5 to 45 mg KOH/g, the storage stability as a treatment solution can be secured and waterproofness at the time formed into a coating can be simultaneously obtained.

The acid value was measured by a method based on JIS K0070-1992. A sample was dissolved in methylethylketone and a phenolphthalein solution was added to prepare a sample solution. The sample solution was titrated by a 0.1N potassium hydroxide ethanol solution and the acid value was calculated from the end point. Further, a sample solution consisting of only methylethylketone was titrated to obtain a blank value. The acid value was calculated by formula 1.

Acid value [mgKOH/g]={0.1[N]×(titrated amount of sample solution−blank value)[ml]×56.11 [g/mol]}/amount of sample [g]   Formula 1

If the water dispersible organic resin becomes less than 5 nm in emulsion average particle size, the organic resin forming the emulsion often becomes too high in acid value and/or becomes too low in molecular weight. For this reason, the barrier property of the coating and the resistance to water and solvents become lower, the waterproofness and solvent resistance become insufficient, and adhesion between the ZnO particles and the plated steel sheet cannot be obtained, therefore this is not suitable as the water dispersible organic resin (B) of the present invention. On the other hand, if the emulsion average particle size exceeds 300 nm, poor coating-forming is caused and bumpy uneven coating is formed, so sufficient waterproofness and solvent resistance cannot be obtained. Further, the emulsion particles become larger than ZnO particles, so in the process of coating and drying the surface treatment solution, sometimes the uniformity of coating of the ZnO particles is impaired, the ZnO particles form an uneven coating, and the formability at the time of hot-pressing, the chemical convertability after hot-pressing, the corrosion resistance after painting, and the spot weldability cannot be stably obtained.

(Solid Content Mass Ratio ($W_A/W_B$))

In the surface treatment solution of plated steel sheet for hot-pressing of the present invention, the mass of the ZnO particles used is 30 mass % to 95 mass % with respect to the total solid content of the surface treatment solution, more preferably 35 mass % to 80 mass %. Further, the mass of the water dispersible organic resin used is 5 mass % to 70 mass % as resin solid content with respect to the total solid content of the surface treatment solution, more preferably 20 mass % to 65 mass %. Note that, here, the "solid content" means the solid component forming the coating and does not include the solvent and the like. The mass ratio ($W_A/W_B$) of the solid content mass ($W_A$) of the ZnO particles to the solid content mass ($W_B$) in the water dispersible organic resin is 30/70 to 95/5.

If the mass ratio ($W_A/W_B$) is less than 30/70, the ratio of the solid content of the water dispersible organic resin in the coating becomes greater, so resin remains on the plated steel sheet after heating and the chemical convertability becomes insufficient, so corrosion resistance after painting cannot be obtained. On the other hand, if ($W_A/W_B$) is over 95/5, the water dispersible resin becomes insufficient in binder effect, the adhesion of the ZnO particles and plated steel sheet becomes insufficient, ZnO particles drop off, and the hot-pressing lubricity, chemical convertability after hot-pressing, and the corrosion resistance after painting are not stably expressed.

The water dispersible organic resin (B) is not particularly limited in type so long as having a 5 to 300 nm emulsion average particle size. As specific examples, a water dispersible polyurethane resin, water dispersible epoxy resin, water dispersible acrylic resin, and water dispersible polyester resin may be mentioned.

The type of the water dispersible polyurethane resin is not particularly limited so long as a non-water-soluble polyurethane resin dispersed in water. A water dispersion of a general polyurethane resin such as a condensation polymer obtained from a diisocyanate or polyisocyanate having two or more isocyanate groups in one molecule and a diol or polyol having two or more hydroxyl groups in one molecule may be used. As the method of dispersion, any of the forced emulsification type using a surfactant or water-soluble polymer or other dispersant for water dispersion and a self emulsification type incorporating hydrophilic groups in the structure can be used.

The type of the water dispersible epoxy resin is not particularly limited so long as a non-water soluble epoxy resin dispersed in water. For example, a polyglycidyl ether compound of a mononuclear polyhydric phenol compound, a polyglycidyl ether compound of a polynuclear polyhydric phenol compound, a polyglycidyl ether of polyvalent alcohols, or other water dispersions may be used. Note that, part of the epoxy resin may be vinyl-modified, acrylic-modified, phosphoric acid-modified, isocyanate-modified, amine-modified, or silyl-modified. As the method of dispersion, a forced emulsification type using a surfactant, water-soluble polymer, or other dispersant for water dispersion or a soap-free self emulsification type introducing hydrophilic groups by modification may also be used.

The type of the water dispersible acrylic resin is not particularly limited so long as a non-water soluble acrylic resin dispersed in water. Further, it may also be one obtained by any polymerization method. For example, a homopolymer or copolymer of a water dispersible acrylic monomer obtained by emulsion polymerization, solution polymerization, core-shell type seed polymerization, and the like in the presence of a polymerization initiator and emulsifier may be mentioned.

The type of the water dispersible polyester resin is not particularly limited so long as a non-water soluble polyester resin dispersed in water. For example, a water dispersion of a condensation resin obtained from polybasic acids selected from a maleic acid, fumaric acid, itaconic acid, succinic acid, glutaric acid, suberic acid, adipic acid, azelaic acid, sebacic acid, dimer acid, trimer acid, isophthalic acid, terephthalic acid, trimellitic acid, trimesic acid, pyromellitic acid, naphthalene dicarboxylic acid, and other polybasic acids, and polyols selected from ethyleneglycol, diethyleneglycol, trimethylolpropane, neopentylglycol, 1,4-CHDM, polymer polyol, polycaprolactone polyol, polycarbonate diol, polybutadiene polyol, neopentylglycol, methylpentadiol, and other polyols may be mentioned.

(Corrosion Resistance Improving Additive (C))

The corrosion resistance improving additive (C) used in the present invention is at least one type of additive selected from compounds including elements selected from B, Mg, Si, Ca, Ti, V, Zr, W, and Ce and further improves the corrosion resistance after painting. The content of the corrosion resistance improving additive (C) is preferably 5 mass % to 60 mass % with respect to the mass of the ZnO particles in the surface treatment solution, more preferably 5 mass % to 20 mass % in range. If less than 5 mass %, the effect of improvement of the corrosion resistance after painting, after hot-pressing is not sufficiently obtained. If over 60 mass %, the additive (C) obstructs the etching effect of the acid on the ZnO particles. Further, the etching effect of the acid on the additive (C) is poor. For this reason, sometimes the etching by the acid component required at the time of chemical conversion treatment is suppressed, the chemical convertability after hot-pressing becomes insufficient, and conversely the corrosion resistance after painting falls. Note that as is generally known, chemical conversion treatment such as treatment for forming zinc phosphate coating forms a coating by bringing an acidic chemical conversion treatment solution into contact with a base material of a metal and the like to etch it. During this time, a pH value of the chemical conversion treatment solution near the contact surface rises, whereby a coating is formed. Therefore, when the etching effect is low, the chemical convertability tends to fall.

As the corrosion resistance improving additive (C), for example, boric acid, zinc borate, ammonium magnesium phosphate, magnesium hydrogen phosphate, magnesium oxide, magnesium acetylacetonate, magnesium citrate, magnesium silicate, colloidal silica, sodium silicate, lithium silicate, potassium silicate, 3-glycidoxypropyltrimethoxysilane, 3-glycidoxypropyltriethoxysilane, 3-aminopropyltriethoxysilane, N-2-(aminoethyl)-3-aminopropyltrimethoxysilane, calcium oxide, calcium phosphate, titanium oxide, titanium hydrofluoric acid, ammonium hexafluorotitanate, di-i-propoxytitanium bis (acetylacetonate), di-i-propoxytitanium bis(triethanolaminate), ammonium metavanadate, vanadium fluoride, vanadyl phosphate, vanadium oxalate, vanadium oxyacetylacetonate, vanadium oxytriisopropoxide, zirconium oxide, zircon hydrofluoric acid, ammonium hexafluorozirconate, ammonium tungstate, sodium tungstate, cerium nitrate, cerium oxide, and the like may be mentioned.

(pH)

The surface treatment solution of the present invention is preferably a pH of 6 to 12, more preferably 8 to 11. If the pH is in this range, the storage stability of the surface treatment solution is also good. If the pH is too low or too high, the storage stability of the surface treatment solution sometimes cannot be obtained.

As a pH adjuster for adjusting the pH, it is possible to use a conventionally known one. For example, phosphoric acid, hydrofluoric acid, nitric acid, formic acid, acetic acid, lactic acid, glycolic acid, phosphonic acid, citric acid, tartaric acid, ammonia, sodium hydroxide, monoethanolamine, diethanolamine, triethanolamine, ethylenediamine, and the like may be mentioned.

(Solvent)

As the solvent of the surface treatment solution of the present invention, water is used, but in accordance with need, such as improvement of the dryability of the coating, it may also be an aqueous solvent to which an alcohol-, ketone-, cellusolve-based water soluble organic solvent is added. The amount of solvent in the surface treatment solution of the present invention is not particularly limited, but 30 mass % to 99 mass % with respect to the total mass of the treatment solution is preferable, and 50 mass % to 90 mass % is more preferable.

(Other Additives)

Additives of a wax, pigment, surfactant, anti foaming agent, leveling agent, thickener, and the like can be added to the surface treatment solution of the present invention, in a range not outside the gist of the present invention or detracting from the coating performance.

(Method of Preparation of Surface Treatment Solution)

The method of preparation of the surface treatment solution of the present invention is not particularly limited. The solution may be produced by a known method. For example, it may be prepared by adding to a ZnO aqueous dispersion (A) a predetermined amount of a water dispersible organic resin (B), and mixing and stirring them.

A preferable mode of a steel sheet treated using the surface treatment solution of the present invention will be explained.

<Plated Steel Sheet for Hot-Pressing Having Surface Treatment Coating>

In the above-mentioned plated steel sheet for hot-pressing having a surface treatment coating of the present invention, the above-mentioned ZnO coating amount is preferably, as Zn, 0.3 to 2 g/m$^2$ per side, more preferably 0.5 to 1.5 g/m$^2$. If the ZnO coating amount is less than 0.3 g/m$^2$, the lubricity at the time of hot-pressing is not obtained, while if over 2 g/m$^2$ as well, the lubricity at the time of hot-pressing is not further improved and conversely the spot weldability falls.

(Method of Production of Plated Steel Sheet to be Hot-Pressed)

The method of production of the plated steel sheet to be hot-pressed having a surface treatment coating of the present invention is a method of production comprising a coating process of coating the surface treatment solution of the present invention on the surface of plated steel sheet containing Al, and a heat drying process of heat drying the surface treatment solution coated on the surface of the plated steel sheet to obtain a coating. Note that, before coating the surface treatment solution of the present invention on the plated steel sheet containing Al, it is also possible to perform pretreatment aimed at removing oil or dirt. The pretreatment is not particularly limited. For example, hot water washing, solvent washing, alkali degreasing and washing, and the like may be mentioned.

The means for coating in the above coating process is not particularly limited. For example, the generally used roll coating, shower coating, air spraying, airless spraying, curtain coating, brushing, dipping, and the like may be mentioned.

As the means for heat drying in the above heat drying process, a dryer, hot air furnace, high frequency induction heating furnace, infrared furnace, and the like may be mentioned. The heat drying temperature in the heat and drying process is a plate maximum temperature of preferably 50 to 200° C., more preferably 60 to 150° C. If the plate maximum temperature is in this range, the moisture evaporation speed becomes fast and the drying efficiency becomes better.

According to the present invention, a specific surface treatment coating containing ZnO particles is formed on the surface of the plated steel sheet, so steel sheet excellent in waterproofness, solvent resistance, adhesion with a plated steel sheet, hot-pressing lubricity, and further chemical convertability after hot-pressing, corrosion resistance after coating, and spot weldability is obtained. The reason is not necessarily clear, but it is believed to be because of the following actions and effects.

The waterproofness, solvent resistance, and adhesion with the plated steel sheet of the surface treatment coating obtained from the water dispersible organic resin depend on the molecular weight and acid value of the organic resin. If the water dispersible organic resin has an average particle size of 5 nm or more, the number average molecular weight of the organic resin exceeds 10000, so the resistance to water or a solvent is high and a tough coating can be obtained. Further, it is believed that the acid value of the water dispersible organic resin gives rise in adhesion due to not only the affinity with water, but also the interaction between the ZnO particles and plating surface.

As the reason why the surface treatment coating containing ZnO particles enables a high lubricity, it is believed that in crystal structure, ZnO becomes particles closer to spherical shapes than other substances and has a smaller frictional resistance to the die used for the press forming. Further, it is believed ZnO has a high melting point (about 1975° C.) and does not melt even at the high temperature in hot-pressing (about 800° C. or more) and the like.

As the reason why the provision of ZnO particles on the plated steel sheet containing Al causes the chemical conversion coating to form well, the change in the reactivity with acid may be considered. In the chemical conversion reaction, due to the acid etching the material, the pH at the material interface rises and a chemical conversion coating forms. It is guessed that if heating the plated steel sheet containing Al to 800° C. or more, the plating surface becomes an Al—Fe alloy layer extremely inert with respect to an acid and a chemical conversion reaction becomes harder to occur. On the other hand, if the plated steel sheet containing Al has a coating containing ZnO particles, the heated plating surface becomes an Al—Zn oxide layer whereby the material becomes able to be etched by chemical conversion, so the chemical conversion coating is formed well and corrosion resistance after electrodeposition painting can be expressed.

Examples

Below, examples will be given to explain the present invention, but the present invention is not limited to these examples.

(1) Test Material

A steel strip having the steel components shown in Table 1 was adjusted to a plate thickness of 1.4 mm through the normal hot rolling, pickling, and cold rolling processes then was applied Al plating on a nonoxidizing furnace type continuous hot dip plating line. The Al plating bath at this time contained 9% of Si and 2% of Fe. The coating amount was adjusted to 40 g/m² per side.

TABLE 1

Steel Components of Test Material
(mass %)

| C | Si | Mn | P | S | Al | N | Cr | B |
|---|---|---|---|---|---|---|---|---|
| 0.225 | 0.21 | 1.24 | 0.003 | 0.002 | 0.02 | 0.0031 | 0.12 | 0.0033 |

(2) Pretreatment (Washing)

As the production method of the test plate, first, the test plate surface was treated by PALKRIN™ N364S manufactured by Nihon Parkerizing Co., Ltd. to remove the oil and dirt from the surface. Next, the surface was rinsed by tap water and it was confirmed that the metal material surface was 100 percentage-wet by water. After that, the surface was flushed with pure water (deionized water) then was dried in an oven at 70° C. atmosphere. This was used as a test plate.

(3) Production Method of ZnO Aqueous Dispersion

To a beads mill, 300 g of zinc oxide powder having an initial particle size 500 nm and 30 g of dispersant were charged into 670 g of water. Zirconia beads having diameter 0.3 mm were used to disperse this to a predetermined average particle size. The particle size distribution was measured by dynamic light scattering type particle size distribution measuring device (Microtrac UPA-EX150, manufactured by Nikkiso Co., Ltd.). The median size (d50) was made the average particle size of the zinc oxide.

(4) Water Dispersible Organic Resin (Water Dispersible Polyurethane Resin)

Polyurethane Resin A

Superflex 150 (manufactured by DKS Co. Ltd.)

(Water Dispersible Acrylic Resin)

Synthesis Method of Acrylic Resin A

As the monomer composition, 72 parts of methyl methacrylate, 27 parts of butyl acrylate, and 1 part of methacrylic acid were used. As the synthesis method, the above monomer was blended with 100 parts of a 10 mass % emulsifier aqueous solution containing the reactive nonionic emulsifier and polyoxyethylene octyl phenyl ether (HLB17.9) blended in 6:4 ratio, then a homogenizer was used for emulsification at 5000 rpm for 10 minutes to obtain a monomer emulsified solution. Next, to a four-necked flask equipped with a stirrer, reflux cooler, thermometer, and monomer feed pump, 150 parts of the emulsifier aqueous solution was added and the result held at 40 to 50° C. A 5 mass % aqueous solution of ammonium persulfate (50 parts) and the above monomer emulsified solution were added to dropwise addition funnels. These funnels were attached to another openings of the flask. The solution was added dropwise about 2 hours and was raised temperature to 60° C. where it continued to be stirred for about 1 hour and made to react. The reaction solution was cooled to room temperature while stirring to obtain an aqueous dispersion of the Acrylic Resin A. This acrylic resin is anionic.

Synthesis Method of Acrylic Resins B to G

A similar synthesis method as the Acrylic Resin A was used to obtain aqueous dispersions of the Acrylic Resins B to G by monomer compositions shown in Table 2.

TABLE 2

| Monomer | Acrylic Resin B | Acrylic Resin C | Acrylic Resin D | Acrylic Resin E | Acrylic Resin F | Acrylic Resin G |
|---|---|---|---|---|---|---|
| Methyl methacrylate | 72 parts | 71 parts | 70 parts | 69.5 parts | 72.5 parts | 68.5 parts |
| N-butyl acrylate | 26.5 parts | 25.5 parts | 25 parts | 24 parts | 27 parts | 23 parts |
| Methacrylic acid | 1.5 parts | 3.5 parts | 5 parts | 6.5 parts | 0.5 part | 8.5 parts |

(Water Dispersible Polyester Resin)

Synthesis Method of Polyester Resin A

An anionic polyester resin obtained by a condensation reaction of an alcohol component comprised of ethyleneglycol: 3.2 parts and neopentylglycol: 30.9 parts and an acid component comprised of isophthalic acid: 16.5 parts, terephthalic acid: 38.2 parts, adipic acid: 7.8 parts, and trimellitic anhydride: 3.4 parts was synthesized by the following method: To a 1000 ml round bottom flask provided with a Claisen tube and an air cooler, the total acid component, total alcohol component, and catalyst (calcium acetate: 0.25 g, N-butyl titanate: 0.1 g) were inserted, the inside of the flask was replaced with nitrogen, and the content was heated to 180° C. for melting. Further, the bath temperature was raised to 200° C. then the content was heated with stirring for about 2 hours to cause an esterification or ester-exchange reaction. Next, the bath temperature was raised to 260° C. then, after about 15 minutes, the inside of the flask was decompressed to 0.5 mmHg to cause a reaction for about 3 hours (polycondensation reaction). After completing reaction, the system was allowed to cool while introducing nitrogen and the content was taken out. To the content taken out, suitable amount of ammonia water was added to give a final pH of 6 to 7. The mixture was heated with stirring in an autoclave at 100° C. for 2 hours to obtain a water dispersible polyester resin.

Synthesis Methods of Polyester Resins B to G

Synthesis methods of similar to the Polyester Resin A were used to obtain aqueous dispersions of the Polyester Resins B to G by the monomer compositions shown in Table 3.

TABLE 3

| Monomer | Polyester Resin B | Polyester Resin C | Polyester Resin D | Polyester Resin E | Polyester Resin F | Polyester Resin G |
|---|---|---|---|---|---|---|
| Terephthalic acid | 38.4 parts | 38.4 parts | 38.6 parts | 39.2 parts | 38.0 parts | 39.2 parts |
| Isophthalic acid | 16.5 parts | 16.6 parts | 16.6 parts | 16.9 parts | 16.4 parts | 16.9 parts |
| Adipic acid | 7.8 parts | 7.9 parts | 7.9 parts | 8.0 parts | 6.9 parts | 8.0 parts |
| Trimellitic anhydride | 3.1 parts | 2.7 parts | 2.5 parts | 0.9 part | 4.6 parts | 0.8 part |
| Ethylene glycol | 3.2 parts | 3.2 parts | 3.2 parts | 3.3 parts | 3.2 parts | 3.3 parts |
| Neopentyl glycol | 31.0 parts | 31.2 parts | 31.2 parts | 31.7 parts | 30.9 parts | 31.8 parts |

(Water Dispersible Epoxy Resin)
Epoxy Resin A
 ADEKA Resin EM-0430 (manufactured by ADEKA Corporation)
(Water-Soluble Resin)
Polyacrylic Acid A
 Jurymer AC-10SL (manufactured by Toagosei Co., Ltd.)
(5) Composition of Surface Treatment Solution
 A ZnO aqueous dispersion and a water dispersible organic resin were blended in water so that the components became the composition ratio shown in Table 4 (mass ratio ($W_A/W_B$)) to obtain a surface treatment solution. Further, the water dispersible organic resin was measured for average particle size (median size) by a dynamic light scattering type particle size distribution measuring apparatus (Microtrac UPA-EX150, manufactured by Nikkiso Co., Ltd.). The results are shown in Table 4.

(6) Treatment Method
 One side of a pretreated test plate was coated with a surface treatment solution by a bar coater and heated to dry to obtain a surface treatment coating. The ZnO coating amount (value as Zn) of the formed surface treatment coating and heating temperature (PMT: plate maximum temperature) are shown in Table 4. The obtained surface treated steel plate was evaluated by the following methods.

TABLE 4

| | ZnO aqueous dispersion (A) | | Water disperaible organic resin (B) | | | |
|---|---|---|---|---|---|---|
| | Average particle size [nm] | Dispersant | Type | Average particle size [nm] | Number average molecular weight | Acid value [mg/KOH/g] |
| Ex. 1 | 50 | Naphthalenesulfonic acid ammonium salt | Polyurethane Resin A | 30 | 500,000 | 20 |
| Ex. 2 | 50 | Naphthalenesulfonic acid ammonium salt | Acrylic Resin C | 94 | 40,000 | 25 |
| Ex. 3 | 50 | Naphthalenesulfonic acid ammonium salt | Polyester Resin B | 20 | 12,000 | 40 |
| Ex. 4 | 50 | Naphthalenesulfonic acid ammonium salt | Epoxy Resin A | 100 | 5,000 | — |
| Ex. 5 | 10 | Naphthalenesulfonic acid ammonium salt | Polyurethane Resin A | 30 | 500,000 | 20 |
| Ex. 6 | 30 | Naphthalenesulfonic acid ammonium salt | Polyurethane Resin A | 30 | 500,000 | 20 |
| Ex. 7 | 100 | Naphthalenesulfonic acid ammonium salt | Polyurethane Resin A | 30 | 500,000 | 20 |
| Ex. 8 | 200 | Naphthalenesulfonic acid ammonium salt | Polyurethane Resin A | 30 | 500,000 | 20 |
| Ex. 9 | 300 | Naphthalenesulfonic acid ammonium salt | Polyurethane Resin A | 30 | 500,000 | 20 |
| Ex. 10 | 100 | Naphthalenesulfonic acid ammonium salt | Acrylic Resin A | 80 | 35,000 | 5 |
| Ex. 11 | 100 | Naphthalenesulfonic acid ammonium salt | Acrylic Resin B | 95 | 40,000 | 10 |
| Ex. 12 | 100 | Naphthalenesulfonic acid ammonium salt | Acrylic Resin C | 94 | 40,000 | 25 |
| Ex. 13 | 100 | Naphthalenesulfonic acid ammonium salt | Acrylic Resin D | 98 | 40,000 | 35 |
| Ex. 14 | 100 | Naphthalenesulfonic acid ammonium salt | Acrylic Resin E | 101 | 42,000 | 45 |
| Ex. 15 | 50 | Sodium polycarbonate | Polyester Resin A | 5 | 10,000 | 45 |
| Ex. 16 | 50 | Sodium polycarbonate | Polyester Resin B | 20 | 12,000 | 40 |
| Ex. 17 | 50 | Sodium polycarbonate | Polyester Resin C | 50 | 13,000 | 35 |
| Ex. 18 | 50 | Sodium polycarbonate | Polyester Resin D | 100 | 15,000 | 30 |
| Ex. 19 | 50 | Sodium polycarbonate | Polyester Resin E | 300 | 18,000 | 5 |
| Ex. 20 | 100 | Polyoxyethylene naphthyl ether | Polyurethane Resin A | 30 | 500,000 | 20 |
| Ex. 21 | 100 | Polyoxyethylene naphthyl ether | Polyurethane Resin A | 30 | 500,000 | 20 |
| Ex. 22 | 100 | Polyoxyethylene naphthyl ether | Polyurethane Resin A | 30 | 500,000 | 20 |
| Ex. 23 | 100 | Polyoxyethylene naphthyl ether | Polyurethane Resin A | 30 | 500,000 | 20 |
| Ex. 24 | 50 | Naphthalenesulfonic acid ammonium salt | Polyurethane Resin A | 30 | 500,000 | 20 |
| Ex. 25 | 50 | Naphthalenesulfonic acid ammonium salt | Polyurethane Resin A | 30 | 500,000 | 20 |
| Ex. 26 | 50 | Naphthalenesulfonic acid ammonium salt | Polyurethane Resin A | 30 | 500,000 | 20 |
| Ex. 27 | 50 | Naphthalenesulfonic acid ammonium salt | Polyurethane Resin A | 30 | 500,000 | 20 |
| Ex. 28 | 50 | Naphthalenesulfonic acid ammonium salt | Polyurethane Resin A | 30 | 500,000 | 20 |
| Ex. 29 | 50 | Naphthalenesulfonic acid ammonium salt | Polyurethane Resin A | 30 | 500,000 | 20 |
| Ex. 30 | 50 | Naphthalenesulfonic acid ammonium salt | Polyurethane Resin A | 30 | 500,000 | 20 |
| Ex. 31 | 50 | Naphthalenesulfonic acid ammonium salt | Polyurethane Resin A | 30 | 500,000 | 20 |
| Ex. 32 | 50 | Naphthalenesulfonic acid ammonium salt | Polyurethane Resin A | 30 | 500,000 | 20 |
| Ex. 33 | 50 | Naphthalenesulfonic acid ammonium salt | Polyurethane Resin A | 30 | 500,000 | 20 |
| Ex. 34 | 50 | Naphthalenesulfonic acid ammonium salt | Polyurethane Resin A | 30 | 500,000 | 20 |
| Ex. 35 | 50 | Naphthalenesulfonic acid ammonium salt | Polyurethane Resin A | 30 | 500,000 | 20 |
| Ex. 36 | 50 | Naphthalenesulfonic acid ammonium salt | Polyurethane Resin A | 30 | 500,000 | 20 |
| Ex. 37 | 50 | Naphthalenesulfonic acid ammonium salt | Polyurethane Resin A | 30 | 500,000 | 20 |
| Comp. Ex. 1 | 500 | Naphthalenesulfonic acid ammonium salt | Polyurethane Resin A | 30 | 500,000 | 20 |
| Comp. Ex. 2 | 5 | Naphthalenesulfonic acid ammonium salt | Polyurethane Resin A | 30 | 500,000 | 20 |
| Comp. Ex. 3 | 50 | Sodium polycarbonate | Polyester Resin F | <5 | 7000 | 65 |
| Comp. Ex. 4 | 50 | Sodium polycarbonate | Polyester Resin G | 500 | 22000 | 3 |
| Comp. Ex. 5 | 100 | Polyoxyethylene naphthyl ether | Polyurethane Resin A | 30 | 500,000 | 20 |
| Comp. Ex. 6 | 100 | Polyoxyethylene naphthyl ether | Polyurethane Resin A | 30 | 500,000 | 20 |
| Comp. Ex. 7 | 50 | Naphthalenesulfonic acid ammonium salt | Polyacrylic acid A | — | 3000 | 310 |

TABLE 4-continued

| | Aspect ratio [—] | $W_A/W_B$ | Corrosion resistance improving additive (C) Type | Amount of addition (mass % with respect to ZnO) | Zn coating amount [g/m²] | PMT [° C.] |
|---|---|---|---|---|---|---|
| Ex. 1 | 1.1 | 80/20 | — | — | 1 | 80 |
| Ex. 2 | 1.1 | 80/20 | — | — | 1 | 80 |
| Ex. 3 | 1.1 | 80/20 | — | — | 1 | 80 |
| Ex. 4 | 1.1 | 80/20 | — | — | 1 | 80 |
| Ex. 5 | 1.1 | 80/20 | — | — | 1 | 80 |
| Ex. 6 | 1.1 | 80/20 | — | — | 1 | 80 |
| Ex. 7 | 1.5 | 80/20 | — | — | 1 | 80 |
| Ex. 8 | 2.0 | 80/20 | — | — | 1 | 80 |
| Ex. 9 | 2.8 | 80/20 | — | — | 1 | 80 |
| Ex. 10 | 1.5 | 30/70 | — | — | 0.5 | 120 |
| Ex. 11 | 1.5 | 30/70 | — | — | 0.5 | 120 |
| Ex. 12 | 1.5 | 30/70 | — | — | 0.5 | 120 |
| Ex. 13 | 1.5 | 30/70 | — | — | 0.5 | 120 |
| Ex. 14 | 1.5 | 30/70 | — | — | 0.5 | 120 |
| Ex. 15 | 1.1 | 60/40 | — | — | 1 | 90 |
| Ex. 16 | 1.1 | 60/40 | — | — | 1 | 90 |
| Ex. 17 | 1.1 | 60/40 | — | — | 1 | 90 |
| Ex. 18 | 1.1 | 60/40 | — | — | 1 | 90 |
| Ex. 19 | 1.1 | 60/40 | — | — | 1 | 90 |
| Ex. 20 | 1.5 | 30/70 | — | — | 2 | 150 |
| Ex. 21 | 1.5 | 60/40 | — | — | 2 | 150 |
| Ex. 22 | 1.5 | 80/20 | — | — | 2 | 150 |
| Ex. 23 | 1.5 | 95/5 | — | — | 2 | 150 |
| Ex. 24 | 1.1 | 35/65 | — | — | 0.5 | 100 |
| Ex. 25 | 1.1 | 35/65 | Zinc borate | 10% | 0.5 | 100 |
| Ex. 26 | 1.1 | 35/65 | Magnesium silicate | 10% | 0.5 | 100 |
| Ex. 27 | 1.1 | 35/65 | Colloidal silica | 10% | 0.5 | 100 |
| Ex. 28 | 1.1 | 35/65 | Calcium oxide | 10% | 0.5 | 100 |
| Ex. 29 | 1.1 | 35/65 | Ammonium hexafluorotitanate | 10% | 0.5 | 100 |
| Ex. 30 | 1.1 | 35/65 | Vanadyl oxy acetylacetonate | 10% | 0.5 | 100 |
| Ex. 31 | 1.1 | 35/65 | Ammonium hexafluorotitanate | 10% | 0.5 | 100 |
| Ex. 32 | 1.1 | 35/65 | Ammonium tungstate | 10% | 0.5 | 100 |
| Ex. 33 | 1.1 | 35/65 | Cerium oxide | 10% | 0.5 | 100 |
| Ex. 34 | 1.1 | 35/65 | Cerium oxide | 5% | 0.5 | 100 |
| Ex. 35 | 1.1 | 35/65 | Cerium oxide | 20% | 0.5 | 100 |
| Ex. 36 | 1.1 | 35/65 | Cerium oxide | 40% | 0.5 | 100 |
| Ex. 37 | 1.1 | 35/65 | Cerium oxide | 60% | 0.5 | 100 |
| Comp. Ex. 1 | 4 | 80/20 | — | — | 1 | 80 |
| Comp. Ex. 2 | 3 | 80/20 | — | — | 1 | 80 |
| Comp. Ex. 3 | 1.1 | 80/20 | — | — | 1 | 90 |
| Comp. Ex. 4 | 1.1 | 80/20 | — | — | 1 | 90 |
| Comp. Ex. 5 | 1.5 | 98/2 | — | — | 2 | 150 |
| Comp. Ex. 6 | 1.5 | 20/80 | — | — | 2 | 150 |
| Comp. Ex. 7 | 1.1 | 80/20 | — | — | 1 | 80 |

(7) Evaluation Methods

Waterproofness

Surface treated steel plate was allowed to stand in a constant temperature and constant humidity chamber at temperature 50° C., humidity 98% for 72 hours. The residual rates of ZnO particles were measured by XRF before and after the test.

E (Excellent): Residual rate of 95 to 100%
  G (Good): Residual rate of 90 to 94%
  F (Fair): Residual rate of 50 to 89%
  P (Poor): Residual rate of 49% or less Solvent Resistance Gauze soaked in ethanol was used to rub against surface treated steel plate by a load of 500 g back and forth 50 times. The residual rates of ZnO particles were measured by XRF before and after the test.

E (Excellent): Residual rate of 95 to 100%
  G (Good): Residual rate of 90 to 94%
  F (Fair): Residual rate of 50 to 89%
  P (Poor): Residual rate of 49% or less Adhesion of Surface Treatment Coating Surface treated steel plate was tested for peeling by Cellophane® tape. The residual rates of ZnO particles were measured by XRF before and after the test.

E (Excellent): Residual rate of 95 to 100%
  G (Good): Residual rate of 90 to 94%
  F (Fair): Residual rate of 50 to 89%
  P (Poor): Residual rate of 49% or less Storage Stability of Surface Treatment Solution The storage stability was made to be judged by the change in the solid content. If the solid content of the surface treatment solution was 90% or more of the initial solid content, it was deemed that the storage stability was maintained. (Note that the case where the storage stability is not maintained is the state where the components of the surface treatment solution precipitate and therefore the solid content of the surface treatment solution falls to less than 90%.) The surface treatment solution was stored by allowing it to stand at 40° C. and the time period in which the storage stability could be maintained was evaluated. The solid content was calculated from the change in weight obtained by taking any amount of the surface treatment solution and drying it by a hot air drying furnace at 110° C. for 2 hours.

G (Good): Storage stability of 3 months or more
F (Fair): Storage stability of 1 month to less than 3 months
P (Poor): Storage stability of less than 1 month Hot-Pressing Lubricity The hot Bowden tester shown in FIG. 1 was used. A weight 1 kg contactor was placed on a test plate. In that state, the test plate was inserted into a furnace held at 900° C. To the test plate, a thermocouple was welded. When reaching 900° C., the furnace temperature was lowered. When reaching 700° C., the furnace with the test plate was driven. The load applied at that time was measured by a load cell. The load was divided by the contactor weight to obtain the dynamic coefficient of friction. The evaluation criteria were as follows:

G (Good): Coefficient of friction of 0.5 or less
F (Fair): Coefficient of friction of 0.5 to less than 0.7
P (Poor): Coefficient of friction of over 0.7

Spot Weldability

A test plate was raised temperature in the atmosphere up to 900° C., then was held there for 1 minute and was rapidly cooled through the die. The test plate was welded under conditions of an AC power source, alumina-dispersed copper electrode, electrode shape DR (tip 6φ-40R), pressing force 400 kgf, welding time 20 cycles, lower limit nugget size 4√t, and upper limit spattering to evaluate the appropriate range of current. The evaluation criteria were as follows:

G (Good): Appropriate range of current of 1.5 kA or more
P (Poor): Appropriate range of current of less than 1.5 kA Chemical Convertability after Heating The test plate was raised temperature in the atmosphere up to 900° C., then was held for 1 minute and rapidly cooled through the die. This test plate was cleaned using an alkali degreasing agent FC-E2001 manufactured by Nihon Parkerizing Co., Ltd. to remove the dirt at the surface. After that, it was rinsed with water and dipped in a solution of a surface conditioner PREPALENE™ X manufactured by Nihon Parkerizing Co., Ltd., for zinc phosphate treatment diluted by tap water to 3 g/L, at room temperature for 30 seconds. After that, the zinc phosphate surface treatment agent PALBOND™ SX35 manufactured by Nihon Parkerizing Co., Ltd. was diluted to 48 g/L by tap water to adjust its total acidity and free acidity and accelerator concentration in accordance with the instructions. The test plate was immersed in the solution at 35° C. for 2 minutes.

G (Good): Zinc phosphate coating densely forms
P (Poor): Zinc phosphate coating does not form Corrosion Resistance after Painting After the above chemical conversion treatment, an epoxy-based cationic electrodeposition paint GT-100 manufactured by Kansai Paint CO., Ltd. was coated to 15 μm. After cross-cutting, then a composite corrosion test JASO-M610 established by the Society of Automotive Engineers of Japan, Inc. was performed for 180 cycles (60 days) to measure the maximum blister width of one side from the cross-cut. The evaluation criteria were as follows:

E (Excellent): Blister of less than 3 mm
G (Good): Blister of 3 to 6 mm
P (Poor): Blister of over 6 mm Table 5 shows the results of evaluation.

TABLE 5

|  | Water-proofness | Solvent resistance | Adhesion | Storage stability | Hot Pressing Lubricity | Spot weldability | Chemical convertability after heating | Corrosion resistance after painting |
|---|---|---|---|---|---|---|---|---|
| Ex. 1 | E | E | E | G | G | G | G | E |
| Ex. 2 | E | E | E | G | G | G | G | E |
| Ex. 3 | G | G | E | G | G | G | G | E |
| Ex. 4 | G | G | G | G | G | G | G | E |
| Ex. 5 | E | E | E | G | G | G | G | E |
| Ex. 6 | E | E | E | G | G | G | G | E |
| Ex. 7 | E | E | E | G | G | G | G | E |
| Ex. 8 | E | E | E | G | G | G | G | E |
| Ex. 9 | E | E | E | G | G | G | G | E |
| Ex. 10 | E | E | G | G | G | G | G | G |
| Ex. 11 | E | E | E | G | G | G | G | G |
| Ex. 12 | E | E | E | G | G | G | G | G |
| Ex. 13 | G | G | E | G | G | G | G | G |
| Ex. 14 | G | G | E | G | G | G | G | G |
| Ex. 15 | G | G | E | G | G | G | G | E |
| Ex. 16 | G | G | E | G | G | G | G | E |
| Ex. 17 | G | G | E | G | G | G | G | E |
| Ex. 18 | G | G | E | G | G | G | G | E |
| Ex. 19 | E | E | G | G | G | G | G | E |
| Ex. 20 | E | E | E | G | G | G | G | E |
| Ex. 21 | E | E | E | G | G | G | G | E |
| Ex. 22 | E | E | E | G | G | G | G | E |
| Ex. 23 | E | E | E | G | G | G | G | E |
| Ex. 24 | E | E | E | G | G | G | G | G |
| Ex. 25 | E | E | E | G | G | G | G | E |
| Ex. 26 | E | E | E | G | G | G | G | E |
| Ex. 27 | E | E | E | G | G | G | G | E |
| Ex. 28 | E | E | E | G | G | G | G | E |
| Ex. 29 | E | E | E | G | G | G | G | E |
| Ex. 30 | E | E | E | G | G | G | G | E |

TABLE 5-continued

|  | Water-proofness | Solvent resistance | Adhesion | Storage stability | Hot Pressing Lubricity | Spot weldability | Chemical convertability after heating | Corrosion resistance after painting |
|---|---|---|---|---|---|---|---|---|
| Ex. 31 | E | E | E | G | G | G | G | E |
| Ex. 32 | E | E | E | G | G | G | G | E |
| Ex. 33 | E | E | E | G | G | G | G | E |
| Ex. 34 | E | E | E | G | G | G | G | E |
| Ex. 35 | E | E | E | G | G | G | G | E |
| Ex. 36 | E | E | E | G | G | G | G | G |
| Ex. 37 | E | E | E | G | G | G | G | G |
| Comp. Ex. 1 | E | E | E | P | P | G | G | E |
| Comp. Ex. 2 | E | E | E | P | F | G | G | E |
| Comp. Ex. 3 | F | F | P | G | G | G | G | E |
| Comp. Ex. 4 | F | F | F | F | F | P | P | P |
| Comp. Ex. 5 | F | F | P | G | F | G | P | P |
| Comp. Ex. 6 | E | E | E | G | G | G | F | P |
| Comp. Ex. 7 | P | P | P | G | G | G | G | E |

INDUSTRIAL APPLICABILITY

According to the present invention, by covering plated steel sheet with a surface treatment coating excellent in waterproofness, solvent resistance, and adhesion, it becomes possible to stably secure hot-pressing lubricity, chemical convertability after hot-pressing, corrosion resistance after painting, and spot weldability in hot-pressing. Accordingly, the present invention enlarges the scope of application of plated steel sheet to hot-pressing and raises the applicability of plated steel sheets to automobiles and industrial machinery which is final use, so the industrial applicability is high.

The invention claimed is:

1. A surface treatment solution for a plated steel sheet to be hot-pressed comprising a ZnO aqueous dispersion (A) and a water dispersible organic resin (B), wherein
the ZnO aqueous dispersion (A) comprises water and ZnO particles having an average particle size of 10 to 300 nm,
the ZnO aqueous dispersion (A) comprises one or both of an anionic dispersant and nonionic dispersant,
the water dispersible organic resin (B) has a 5 to 300 nm emulsion average particle size, and
a mass ratio ($W_A/W_B$) of a mass ($W_A$) of ZnO particles in the ZnO aqueous dispersion to a mass ($W_B$) of solid content in the water dispersible organic resin is 30/70 to 95/5,
wherein the ZnO particles have an aspect ratio (long axis/short axis) of 1 to 2.8.

2. The surface treatment solution for a plated steel sheet to be hot-pressed according to claim 1, wherein the water dispersible organic resin (B) is one or more types of resin selected from a group consisting of a water dispersible polyurethane resin, a water dispersible epoxy resin, a water dispersible acryl resin, and a water dispersible polyester resin.

3. The surface treatment solution for a plated steel sheet to be hot-pressed according to claim 2, wherein the water dispersible organic resin (B) has a number average molecular weight of 10000 or more.

4. The surface treatment solution for a plated steel sheet to be hot-pressed according to claim 2, wherein the water dispersible organic resin (B) is one or more types of resin having a 5 to 45 mg KOH/g acid value and selected from a group consisting of a water dispersible polyurethane resin, a water dispersible acryl resin, and a water dispersible polyester resin.

5. The surface treatment solution for a plated steel sheet to be hot-pressed according to claim 2, comprising at least one type of additive (C) selected from compounds comprising elements selected from the group consisting of B, Mg, Si, Ca, Ti, V, Zr, W, and Ce.

6. The surface treatment solution for a plated steel sheet to be hot-pressed according to 1, wherein the water dispersible organic resin (B) has a number average molecular weight of 10000 or more.

7. The surface treatment solution for a plated steel sheet to be hot-pressed according to claim 6, wherein the water dispersible organic resin (B) is one or more types of resin having a 5 to 45 mg KOH/g acid value and selected from a group consisting of a water dispersible polyurethane resin, a water dispersible acryl resin, and a water dispersible polyester resin.

8. The surface treatment solution for a plated steel sheet to be hot-pressed according to claim 6, comprising at least one type of additive (C) selected from compounds comprising elements selected from the group consisting of B, Mg, Si, Ca, Ti, V, Zr, W, and Ce.

9. The surface treatment solution for a plated steel sheet to be hot-pressed according to claim 1, wherein the water dispersible organic resin (13) is one or more types of resin having a 5 to 45 mg KOH/g acid value and selected from a group consisting of a water dispersible polyurethane resin, a water dispersible acryl resin, and a water dispersible polyester resin.

10. The surface treatment solution for a plated eel sheet to be hot-pressed according to claim 9, comprising at least one type of additive (C) selected from compounds comprising elements selected from the group consisting of B, Mg, Si, Ca, Ti, V, Zr, W, and Ce.

11. The surface treatment solution for a plated steel sheet to be hot-pressed according to claim 1, comprising at least one type of additive (C) selected from compounds comprising elements selected from the group consisting of B, Mg, Si, Ca, Ti, V, Zr, W, and Ce.

12. The surface treatment solution for a plated steel sheet to be hot-pressed according to claim 11, wherein a mass ratio ($W_C/W_A$) of a mass ($W_C$) of the additive (C) to a mass ($W_A$) of the ZnO particles in the ZnO aqueous dispersion is 0.05 to 0.6.

* * * * *